United States Patent [19]

Okada

[11] 3,734,409
[45] May 22, 1973

[54] STEAM/WATER MIXING VALVE
[75] Inventor: Masao Okada, Nishinariku, Osaka, Japan
[73] Assignees: Masao Okada, Nisinariku, Osaka City; Masao Nozawa, Ryugazaki-shi, Ibaraki Pref., Japan
[22] Filed: Apr. 14, 1972
[21] Appl. No.: 244,109

[52] U.S. Cl. ............. 239/99, 137/625.41, 236/12 R
[51] Int. Cl. .................. G05d 11/16, G05d 23/13
[58] Field of Search ................. 236/12 R, 99; 137/625, 41

[56] References Cited
UNITED STATES PATENTS
796,252  8/1905  Ross et al. ............... 137/625.41 X
2,057,226  10/1936  Bleecker .................. 137/625.41 X Primary Examiner—William E. Wayner
Attorney—George B. Oujevolk

[57]  ABSTRACT

A valve having a porous disc and a handle, where the rotation of former by manipulation of the latter initially opens a water inlet to a given extent and then opens a steam inlet gradually up to a given extent so as to introduce cold water and steam into a mixing chamber at given rates, respectively, delivering hot water of desired temperature instantly and continuously through a tap.

2 Claims, 5 Drawing Figures

Patented May 22, 1973 3,734,409

STEAM/WATER MIXING VALVE

The present invention relates to a valve device, and more particularly to a valve to mix steam and cold water to deliver hot water of desired temperature instantly and continuously.

Conventionally, a valve device of this kind is provided with a pair of independent flow-regulating valves to be operated manually with handles or knobs at inlets for steam and water, respectively. And the temperature of hot water to be delivered is controlled by the manual operation of both valve handles or knobs independently. In this case, practically, the water valve is initially opened to a considerable extent and then the steam valve is opened to a desired extent carefully so as to obtain hot water of desired temperature. Should the steam valve be opened excessively or before the water valve carelessly, too hot water or steam would spout out and possibly cause burning.

A main object of the invention is to provide a valve device to mix steam and cold water to deliver hot water of desired temperature safely, assuredly and quietly.

Another object of the invention is to provide a mixing valve where operation of a single handle initially opens a water inlet to a given extent and then opens a steam inlet gradually up to a given extent to introduce cold water and steam into a mixing chamber at given rates, respectively.

A further object of the invention is to provide a steam/water mixing valve which stops delivering hot water automatically when it exceeds a given temperature.

A further object of the invention is to provide a steam/water mixing valve which avoids emitting acute impulsive noises on mixing.

Figure 1:
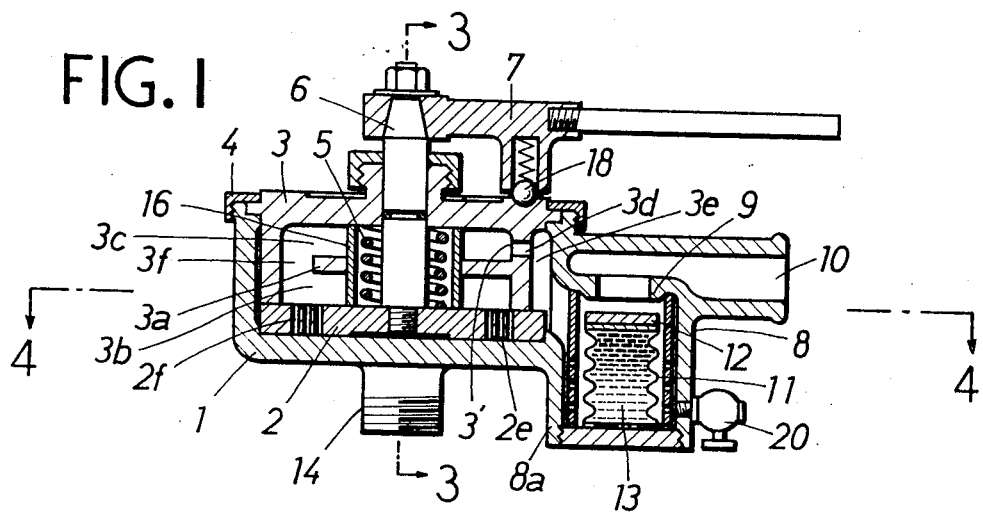
FIG. 1 is a vertical elevation of a steam/water mixing valve embodying the invention.

A cylindrical casing 1 is opened at the upper end and closed at the lower end. A valve disc 2 is mounted on the bottom of casing 1 in a slidable relation. A partially cylindrical mixing chamber 3 which is closed at the upper end and opened at the lower end is mounted on the valve disc 2 in a slidable relation. The mixing chamber 3 is fixed to the casing 1 with a cap nut 4 on the shoulder of same chamber against the elasticity of a compression spring 5. The lower end of a central shaft 6 is firmly fixed to the valve disc 2. The upper portion of same shaft is extended out of the mixing chamber 3. A handle 7 is fixed to the upper end of shaft 6. And a tap 10 is provided at one side of casing 1.

Figure 4:
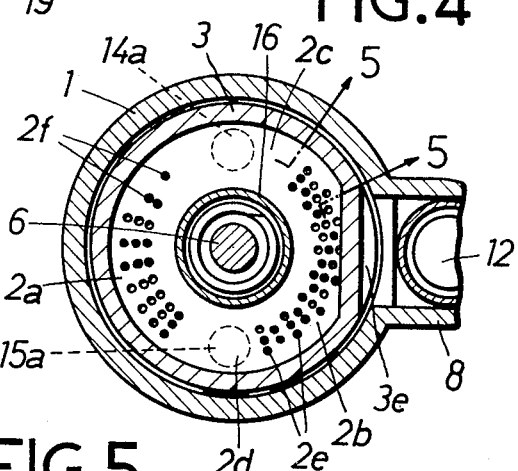
FIG. 4 is a cross section taken approximately on the line 4—4 in FIG. 1.

The partially cylindrical mixing chamber 3 is provided with a flat side wall 3' at the side where the tap 10 is provided to the casing 1, so that a clearance 3e with a crescent cross section is provided between the mixing chamber 3 and the casing 1 as shown in FIG. 4.

The mixing chamber 3 is divided into an upper compartment 3c and a lower compartment 3b with an intermediate partition 3a which is partially circular in cross section so as to provide a passage 3f between both compartments 3b, and 3c. An aperture 3d is provided through the flat side wall 3' to provide communication between the crescent clearance 3e and the upper compartment 3c.

A steam inlet 14a and a water inlet 15a are provided in the bottom periphery of casing 1. The inlets 14a and 15a are connected to a steam and a water source (not shown) by way of pipes 14 and 15, respectively. Packings 13 and 13 are provided circularly at both sides of inlets 14a & 15a in the bottom of casing 1 so as to provide sufficient steam-tightness between the valve disc 2 and the casing bottom.

Figure 5:
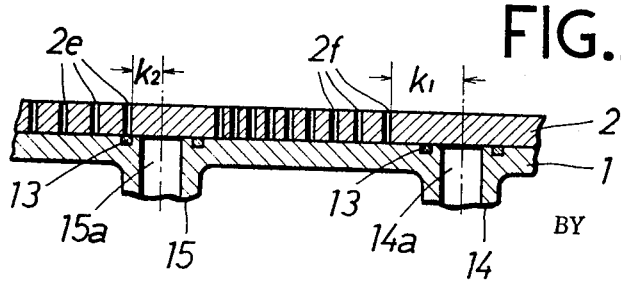
FIG. 5 is a developed sectional view taken approximately on the line 5—5 in FIG. 4.

The peripheral area of valve disc 2 is divided into plain zones 2c & 2d and porous zones 2a & 2b. The plain zones 2c & 2d are located just above the inlets 14a & 15a of casing 1, respectively, when the disc 2 is in the position shown in FIG. 4; the disc 2 is in this position when the handle 7 is put in a position shown in dark lines in FIG. 2. The porous zones 2a & 2b are intermediate both plain zones 2c & 2d as shown in FIG. 4. The porous zone 2a is circumferentially k1 distant counterclockwise from the center of plain zone 2c, and the porous zone 2b is circumferentially k2 distant counterclockwise from the center of plain zone 2d, k1 being substantially larger than k2, as shown in FIG. 5. The widths of porous zones 2a & 2b are substantially same as the diameters of inlets 14a & 15a, respectively.

A plurality of small steam pores 2f are distributed in the porous zone 2a in an arrangement that the number of pores per unit area is given considerably less in one portion of 2a near to the plain zone 2c than the rest portion of 2a far from the plain zone 2c. A plurality of small water pores 2e are distributed in the porous zone 2b in an arrangement that the number of pores per unit area is given unform all through the same zone 2b.

An auxiliary valve 8 is provided intermediate the casing 1 and the tap 10. The auxiliary valve 8 comprises a casing 8a, a valve seat 9 at the upper end of casing 8a, a bellows 11 provided in the casing 8a, a valve plate 12 provided at the top of bellows 11 oppositely to the valve seat 9, and a drain cock 20 at the lower end of casing 8a. Thermally expansive liquid such as ether is enclosed in the bellows 11.

A protecting sheath 16 is provided around the spring 5, which keeps the mixing chamber 3 in a sufficiently slidable relation to the valve disc 2. An "O" ring is provided around the central shaft 6. A ball clutch 18 is provided in an extending relation with the handle 7. A plurality of ball seats 19 are provided radially at the top of mixing chamber 3 to retain the handle 7 in desired positions, respectively, as shown in FIG. 2.

Figure 2:
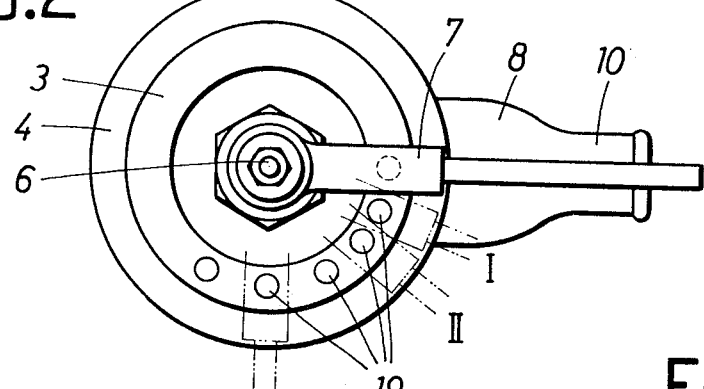
FIG. 2 is a plan view of FIG. 1.
Figure 3:
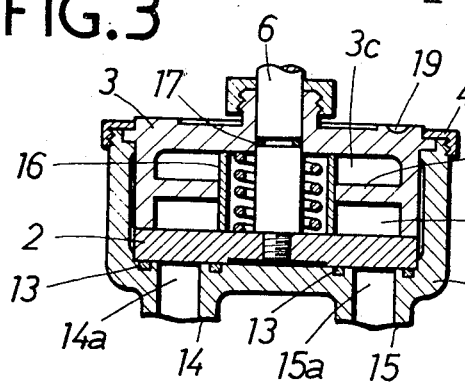
FIG. 3 is a transverse section taken approximately on the line 3—3 in FIG. 1.

In the operation, the handle 7 is initially put in a position shown in dark lines in FIG. 2, then steam and cold water are continuously supplied from the sources to the inlets 14a & 15a by way of the pipes 14 & 15, respectively. In this state, the valve disc 2 is in the position shown in FIG. 4 where both plain zones 2c & 2d are just above the steam and the water inlet 14a & 15a, respectively; in other words, the valve disc 2 closes both inlets 14a & 15a. Thus neither steam nor water enters into the mixing chamber 3.

When the handle 7 is put into a position (I) shown in dotted lines in FIG. 2, the valve disc 2 is rotated clockwise more than k2 but less than k1 circumferentially from the original position shown in FIG. 4, so that the porous zone 2b is just above the water inlet 15a while the plain zone 2c is still above the steam inlet 14a; in other words, the valve disc 2 opens the water inlet 15a to a given extent while closes the steam inlet 14a. Thus cold water enters into the lower compartment 3b of mixing chamber 3 at a given rate through the water pores 2e. Thence cold water goes through the passage 3f, upper compartment 3c, aperture 3d, crescent clearance 3e, auxiliary valve 8, and is delivered through the tap 10 continuously.

When the handle 7 is put further into a position (II) shown in dotted lines in FIG. 2, the valve disc 2 is rotated further clockwise more than k1 circumferentially from the original position shown in FIG. 4, so that the portion with comparatively small number of pores per unit area of porous zone 2a is just above the steam inlet 14a while the porous zone 2b is already above the water inlet 15a; in other words, the valve disc 2 opens the water inlet 15a to a given extent and the steam inlet 14a to an intermediate extent. Thus steam enters into the lower compartment 3b of mixing chamber 3 at a comparatively moderate rate through the steam pores 2f while cold water continues to enter into the lower compartment 3b at a given rate through the water pores 2e, thereby steam and cold water are mixed to be hot water of comparatively moderate temperature. Thence hot water of comparatively moderate temperature is delivered through the tap 10 continuously by way of the passage 3f, upper compartment 3c, aperture 3d, crescent clearance 3e and auxiliary valve 8.

When the handle 7 is put still further into a position (III) shown in dotted lines in FIG. 2, the valve disc 2 is rotated still further clockwise, so that the portion with comparatively large number of pores per unit area of porous zone 2a is just above the steam inlet 14a while the porous zone 2b is still above the water inlet 15a; in other words, the valve disc 2 opens both inlets 14a & 15a to given extents, respectively. Thus steam enters into the lower compartment 3b of mixing chamber 3 at a comparatively high rate through the steam pores 2f while cold water continues to enter into the same compartment at a given rate through the water pores 2e, thereby steam and cold water are mixed to be hot water of comparatively high temperature. Thence hot water of comparatively high temperature is delivered through the tap 10 continuously by way of the passage 3f, upper compartment 3c, aperture 3d, crescent clearance 3e and auxiliary valve 8.

As the handle 7 is put reversely from the position (III) to (II) and (I), the temperature of hot water to be delivered through the tap 10 is lowered step by step in a manner just reverse to the above described. And the delivery is stopped at all when the handle 7 is returned to the original position.

If the supply of cold water is decreased sharply or suspended accidentally, too hot water or steam will flow into the auxiliary valve 8. Then the belows 11 will extend due to the thermal expansion of liquid 13 till the valve plate 12 comes into a tight contact with the valve seat 9, closing the passage of hot water or steam before the tap 10. Thus too hot water or steam will never be delivered through the tap 10 accidentlly.

Since both steam and water enter into the mixing chamber 3 in quite dispersed ways at substantially limited rates through the small pores 2f & 2e respectively, they do not emit acute impulsive noises at all on mixing.

What I claim:

1. A valve device to mix steam and cold water to deliver hot water of desired temperature, comprising a cylindrical casing having a bottom plate, a valve disc mounted on said bottom plate in a slidable relation, a partly cylindrical mixing chamber mounted on said valve disc in a slidable relation, a central shaft the lower end of which is fixed to said valve disc and the upper end of which is extended out of said mixing chamber, a handle fixed to the upper end of said central shaft, and a tap provided at one side of said cylindrical casing, said mixing chamber being opened at the lower end and closed at the upper end thereof, the upper end of said mixing chamber being fixed to said cylindrical casing with a cap nut against the elasticity of a spring provided intermediate said mixing chamber and said valve disc, said mixing chamber being provided with a flat side wall so as to provide a crescent clearance between said flat wall and said cylindrical casing on the side where said tap is provided, said mixing chamber being divided into an upper and a lower compartment by the intermediary of a partly circular partition, said flat side wall of mixing chamber being provided with an aperture therethrough to provide communication between said upper compartment and said crescent clearance, said valve disc being provided with a pair of plain zones and a pair of porous zones at the periphery thereof, said porous zones being intermediate said plain zones circumferentially of said disc, one of said porous zones being provided with a plurality of small steam pores and the other of said porous zones being provided with a plurality of small water pores, the distance from said porous zone for steam to the center of one of said plain zones being substantially larger than the distance from said porous zone for water to the center of the other of said plain zones in one circumferential direction of said disc, said bottom plate of cylindrical casing being provided with a steam inlet and a water inlet.

2. A valve device in accordance with claim 1, further provided with an auxiliary valve means intermediate said tap and said crescent clearance, said auxiliary valve means having a bellows member enclosing thermally expansive liquid to open and close the passage of hot water or steam between said crescent clearace and said tap in response to the temperature of hot water or steam.

* * * * *